United States Patent [19]

Chapman

[11] Patent Number: 4,747,424

[45] Date of Patent: May 31, 1988

[54] HYDRAULIC VALVE

[76] Inventor: Leonard T. Chapman, 13760 Chandler Blvd., Van Nuys, Calif. 91401

[21] Appl. No.: 914,489

[22] Filed: Oct. 2, 1986

[51] Int. Cl.$^4$ .............................................. F15B 13/06
[52] U.S. Cl. .......................................... 137/1; 91/457;
137/596.17; 137/596.2; 137/636.1; 137/868;
137/870; 182/2; 182/19; 251/294
[58] Field of Search ...................... 91/457; 137/596.17,
137/596.2, 636.1, 867, 868, 870, 1; 182/2, 19;
251/294

[56] References Cited

U.S. PATENT DOCUMENTS

| | | | |
|---|---|---|---|
| 835,467 | 11/1906 | Rankin | 137/596.2 X |
| 1,187,960 | 6/1916 | Austin | 137/596.2 |
| 2,317,065 | 4/1943 | Kaelin | 137/636.1 |
| 3,982,726 | 9/1976 | Bublitz et al. | 251/129.11 |
| 4,075,930 | 2/1978 | Millett | 91/361 |
| 4,109,678 | 8/1978 | Chapman | 137/596.2 |
| 4,190,081 | 2/1980 | Coles | 137/625.65 X |
| 4,508,143 | 4/1985 | Ogasawara | . |
| 4,526,342 | 7/1985 | Wakefield | 251/129.11 X |

Primary Examiner—Gerald A. Michalsky
Attorney, Agent, or Firm—Lyon & Lyon

[57] ABSTRACT

The present invention provides a valve for controlling fluid flow. The tapered actuation surface of the actuation cam of the present invention controlled by electric motors may be utilized to gradually open and close the various pistons which regulate flow through the valve passageways. An actuation monitor acts to measure the amount of piston actuation so as to permit interactive control of the valve. One embodiment of the present invention may be utilized in response to signals received from an apparatus connected to a boom support member mounted on the back of the truck wherein it is desired to maintain the boom support apparatus in the substantially vertical direction.

22 Claims, 3 Drawing Sheets

HYDRAULIC VALVE

BACKGROUND OF THE INVENTION

The field of the present invention is valves for controlling fluid flow, and more particularly, valves which permit a controlled variable amount of fluid therethrough so as to permit gentle movement of components or the like controlled by such valves.

Numerous valves are known in the art for controlling fluid flow therethrough. As is known to those skilled in the art, each of these different valves has its own characteristics and advantages. These characteristics and advantages result from the constraints imposed by the application for which the valves were originally designed.

In many applications, it is desirable to provide means for permitting extremely fine adjustments to the amount of flow through the valve. One such application is in conjunction with hydraulic components. Oftentimes, it is necessary and important to provide smooth movement of the hydraulic component or components controlled by the operation of the valve. Valves presently available for controlling the flow of incompressible fluids such as hydraulic fluid, suffer a uniform problem in that they do not provide for the efficient and reliable slow or gradual opening and closing of the valves. Such a characteristic is advantageous as it permits the valve to provide a slow or gradual increase or decrease in the amount of fluid flowing through the valve to the components, thereby permitting the components to move in a smooth and shock-free manner.

SUMMARY OF THE INVENTION

The present invention provides a means by which flow of fluid through a valve may be gradually initiated, regulated and ceased. In the preferred embodiment, pistons are positioned in the various passageways of the valve and are controlled through rotary actuation cams having a tapered actuation surface. As such, it is an object of the present invention to provide a valve for gradually controlling fluid flow therethrough.

It is a further object of the present invention to provide sensor means by which the amount of actuation of the valve may be determined. Other and more detailed objects to the present invention may be determined from an examination of the materials contained herein.

DESCRIPTION OF THE PREFERRED EMBODIMENTS

The present invention may be utilized in any application where finely controlled fluid flow through a valve is desirable or necessary. The preferred embodiment of the present invention shall be described in connection with hydraulic components but, as will be understood by those skilled in the art, may be utilized in connection with any fluid flow, especially any flow of substantially incompressible fluid which controls the movement of hydraulic components or the like.

Figure 1:
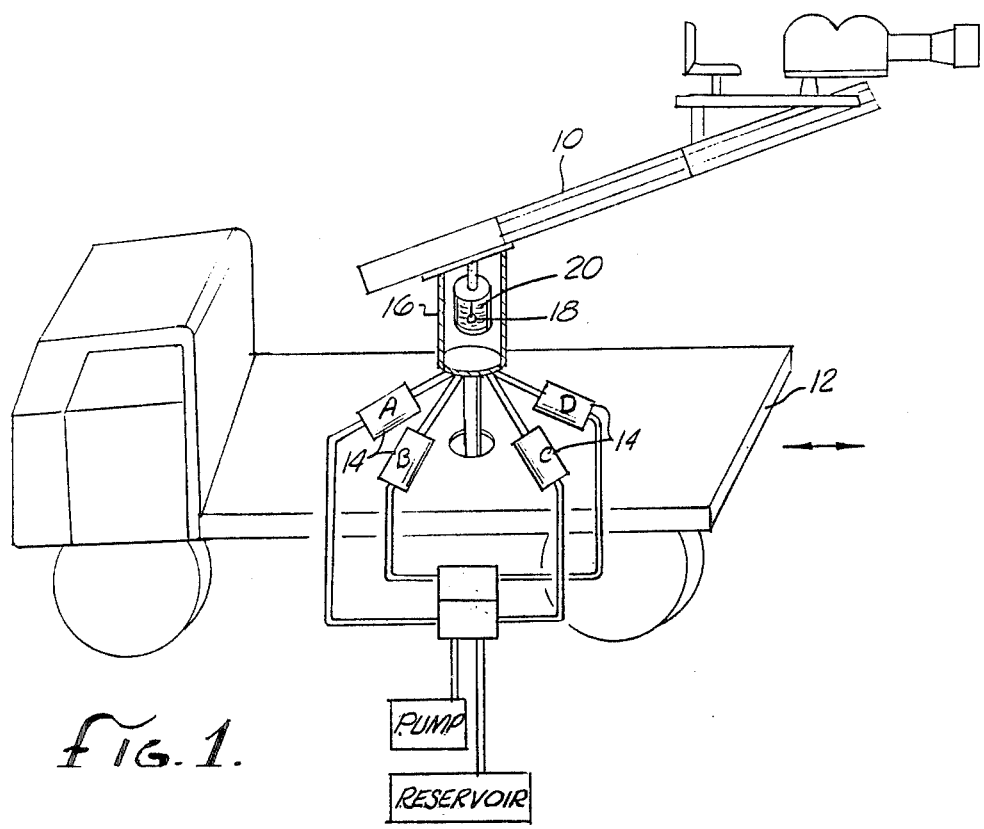
FIG. 1 shows a prospective schematic view of a system for controlling movement of a boom mounted on a truck bed, on which the present invention might be utilized.
Figure 2:
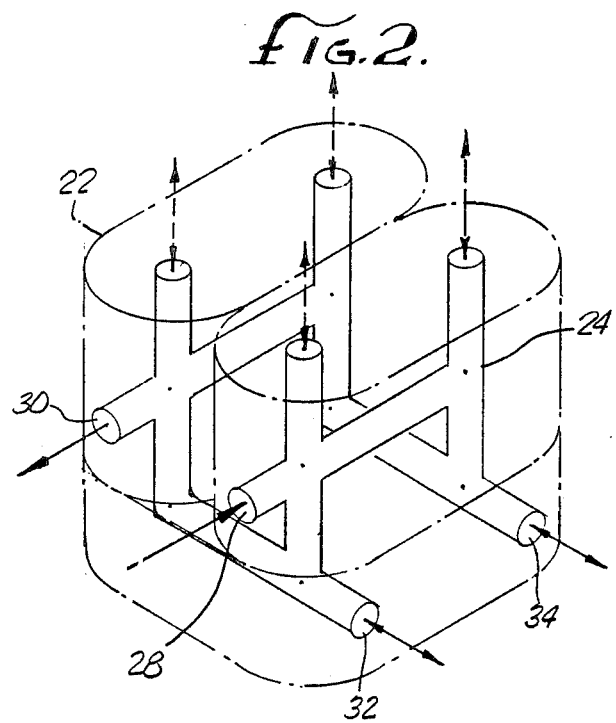
FIG. 2 shows a prospective view of the passageways in the preferred embodiment of the present invention.
Figure 3:
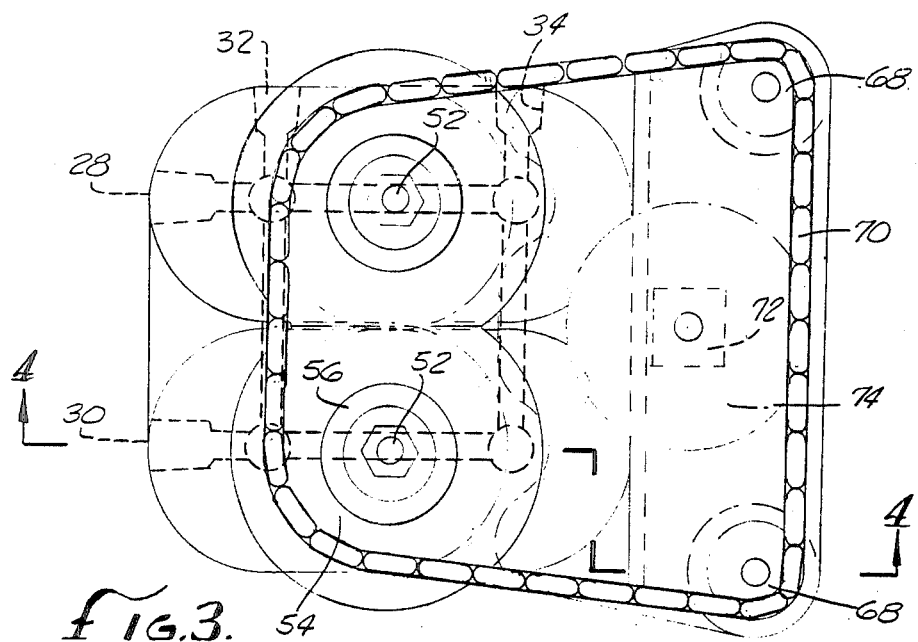
FIG. 3 shows a top view of the preferred embodiment of the present invention.
Figure 4:
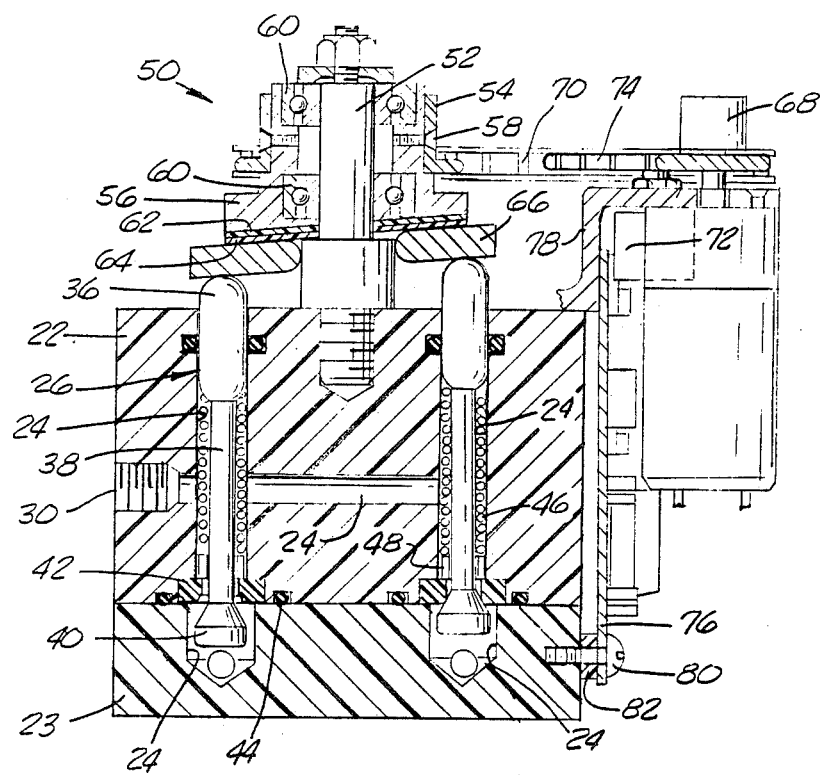
FIG. 4 is a cross-sectional view taken substantially along line 4—4 of FIG. 3.

As illustrated in FIG. 1, the present invention may be used to control the movement of a boom 10 mounted to the bed of the truck 12. In such an application, two valves of the present invention are used to control flow to the four hydraulic cylinders 14A-D, respectively. One valve of the present invention controls flow to the cylinders which adjust movement of the boom mounting structure forward and rearward; the other controlling movements of the boom mounting structure port and starboard directions. In such applications, it is desirable to maintain the boom mounting structure 16 substantially along the vertical.

One method known in the art for determining whether a boom mounting structure 16 is substantially vertically aligned is to suspend a pendulum 18 from a not-shown universal joint within the boom mounting structure 16. Unwanted vibrations of the pendulum 18 are prevented by mounting the pendulum 18 in a container of viscous fluid 20, also suspended within the boom mounting structure 16. Four not-shown micro switches or contact switches provide a signal when the pendulum 18 moves out of alignment with the vertical. The valves of the present invention use such signals in order to control hydraulic fluid flow into the cylinders 14 A-D which control the position of the boom mounting structure 16.

Referring to FIGS. 2-4 and 6-7, the present invention includes a valve body 22 and a valve base 23, each having passageways 24 therethrough. Pistons 26 are positioned within the passageways 24 and arranged to selectively open or close those passageways 24 in response to an actuation means 50. For purposes of example, in a four-way valve of the present invention fluid flows through the passageways 24 and enters and exits through ports as indicated by the solid line arrows in FIG. 2. In addition, pistons 26 positioned in the passageways 24 move as a result of applied force (as described herein) in the direction of the broken line arrows.

Although illustrated herein as a four-way valve, as will be understood by those skilled in the art, the present invention may be configured as a two-way or three-way valve. In addition, as will be understood by those skilled in the art, the present invention may also be configured as an open center valve. As such, no limitations other than those imposed in the appended claims should be inferred from the following description of the preferred embodiment of the invention as a four way closed center valve.

Returning to FIGS. 2-4 and 6-7, the preferred embodiment of the present invention includes a fluid supply port 28, a fluid return port 30 and two inlet-outlet ports 32 and 34, respectively. The valve pistons 26 include an ellipitical head 36, a connection shaft 38 and a plug member 40. The plug member 40 is preferably substantially frusto-conically shaped. A seal member 42 is positioned in the valve body 22 so as to cooperatively interact with the plug member 40 of each valve piston 26. As will be understood to those skilled in the art, the seal members 42 may be constructed from a hardened material or a resilient material. Additional seal members 44 are provided so as to insure a complete seal is provided between the valve body 22 and the valve base 23.

The pistons 26 are biased in a first direction through a resilient biasing member. In the preferred embodiment, the resilient biasing member includes a compression spring 46 extending between the valve piston heads 36 and spring spacer means 48. The amount of biasing exerted on the piston 26 may be varied by changing the length of the spring spacer means 48. In certain cases, the spring spacer means 48 is constructed with an aperture so as to permit fluid to pass through the adjacent passageways 24. It should be kept in mind that although alternative biasing means may be used in place of the spring member 46, it is necessary to have a biasing means which will permit fluid flow through the passageways 24. Actuation of the valve pistons 26 against the biasing means acts to unseat the plug members 40 from their corresponding seal members 42, thereby opening the corresponding passageways 24.

Actuation of the pistons 26 is accomplished by an actuation means 50 acting on the piston head 36. In the preferred embodiment, the actuation means 50 includes a pair of pivot posts 52 secured to the valve body 22. An actuation cam 56 is mounted to each of the pivot posts 52 through bearings 60. Each actuation cam 56 has a tapered or inclined actuation surface 62. A single or a pair of washers 64 are positioned between a wobble plate 56 and the sloped actuation surface 62 of each actuation cam 56. The washers 64 are constructed so as to have a low friction value and, may, for example, be coated with a semipermanent lubricant such as that marketed under the trademark TEFLON. The actuation surface 62 of each actuation cam 56 acts on two of the four pistons 26 provided in each four-way valve of the present invention.

In the preferred embodiment, the actuation cams 56 are driven in tandem by two electric motors 68 through a continuous chain 70 and a sprocket 54 connected to each actuation cam 56 through centering adjustment screws or the like 58. The amount of actuation of the pistons 26 may be determined by an actuation monitor which, for example, determines the amount of rotation of the actuation cams 56. Such angular measurements are preferably accomplished by a potentiometer 72 driven by the continuous chain 70 through a sprocket 74. It is desirable to provide such an actuation monitor as it permits interactive control of the valve of the present invention.

Figure 5:
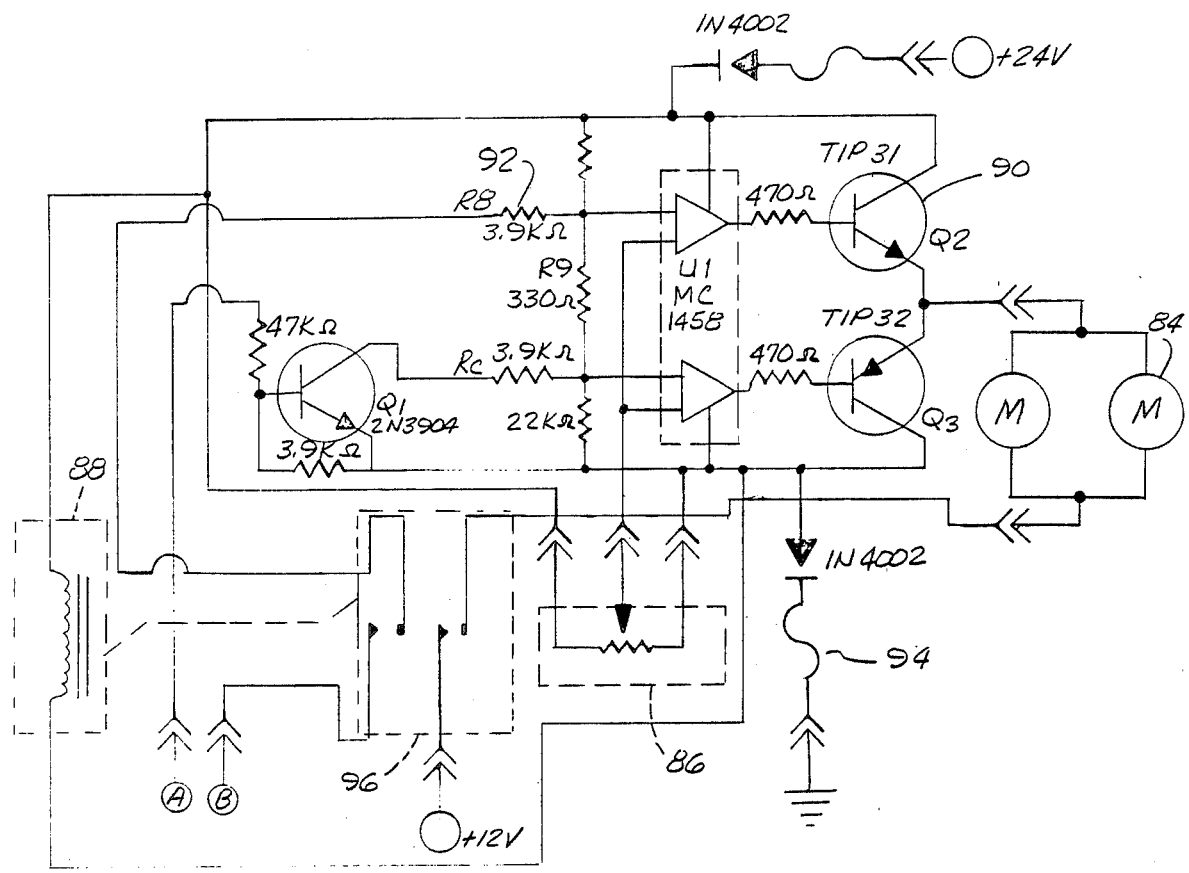
FIG. 5 is an electrical schematic diagram of the preferred embodiment of the circuitry controlling the operation of the preferred embodiment of the present invention.

In the preferred embodiment, the electric motors 68, the potentiometer 72 and the circuit board 76 containing the electrical components which comprise the preferred circuitry of the present invention are connected to the valve body 22 and the valve base 23 by a mounting plate 78 at one end and screws 80 or the like at the other end. Spacers 82 are constructed for example from a material such as nylon, should be positioned between the circuit board 76 and the valve body 22 or base 23 in order to avoid malfunctions of the present valve through electrical short circuits or the like.

Where the present invention is utilized in conjunction with a system such as a boom mounted on the bed of a truck 12, it is necessary to provide electrical circuitry so as to enable the device to operate based on receipt of the above-discussed pendulum signals. As shown in FIG. 5, the present invention so instructed includes a simple electrical circuit for receiving and responding to the signals from the pendulum apparatus described above. This schematic diagram illustrates the electric motors 84, the rotary potentiometer 86, a relay coil 88, transistors 90, numerous resistors 92 having different values, and fuses 94. An additional relay 96 is provided for connecting the circuit to the hanging pendulum 18 or the like.

In the preferred embodiment of the circuit illustrated in FIG. 5, the fuses 94 are GMA 1 Amp fast blow fuses. In addition, the potentiometer 86 is a 25K Ohm linear taper potentiometer. Alternatively, a potentiometer having resistance values ranging from 10K to 500K Ohms may be used. Finally, twelve Volt direct current motors are used in the preferred embodiment of the present invention.

The two resistors 92 indicated by $R_B$ and $R_C$ have been chosen due to the characteristic of the preferred embodiment, where full valve open is accomplished when the actuation cam 56 has rotated through approximately 90 degrees. As will be understood by those skilled in the art, different values of $R_B$ and $R_C$ may be utilized where a different turning angle is desired for full valve open. Similarly, the value of $R_A$ may be varied in order to vary the reset center detent width. As will be understood to those skilled in the art and as is explained in Chapman, U.S. patent application Ser. No. 914,490, filed on Oct. 2, 1986, which application is hereby referred to and incorporated herein in full by reference, the center detent width or zone is in essence the electrical tolerance of the integrated circuit. If a voltage change of less than the magnitude of the detent zone value is received, the integrated circuit, used as a window comparator, will not produce any voltage differential to the motor. Only where the voltage differential presented to the window comparator is above the value of the center detent zone will the motor actuate in such a direction so as to attempt to match the voltage differential presented. For example, where a positive voltage differential is provided the motors, in response to this voltage differential, will rotate in a first direction, e.g. the clockwise direction. Alternatively, where a negative voltage potential is placed across the motors, the motors will respond by rotating in the opposite direction, e.g. the counterclockwise direction. Naturally, where any of the electrical components are mounted to the portion of the printed circuit board which is directly adjacent to the mounting bracket 78, the valve body 22 or valve base 23, such electrical component should be mounted through non-conductive means such not-shown nylon screws or the like or metal fasteners fully insulated from the circuit.

Having fully described the structure of the present invention, its operation will now be described in reference to the figures. As stated above, the preferred embodiment of the present invention is configured as a four way closed-center valve for controlling two hydraulic cylinders 14A and 14C arranged to position a boom mounting structure 16 on the bed of the truck 12. So configured, the two hydraulic cylinders 14A and C must be arranged so as to control movement of the boom mounting structure 16 in either the truck forward or rearward direction (i.e. to the left and right in FIG. 1) or the truck starboard and port directions (i.e. to the truck left and right).

Figures 6, 7:
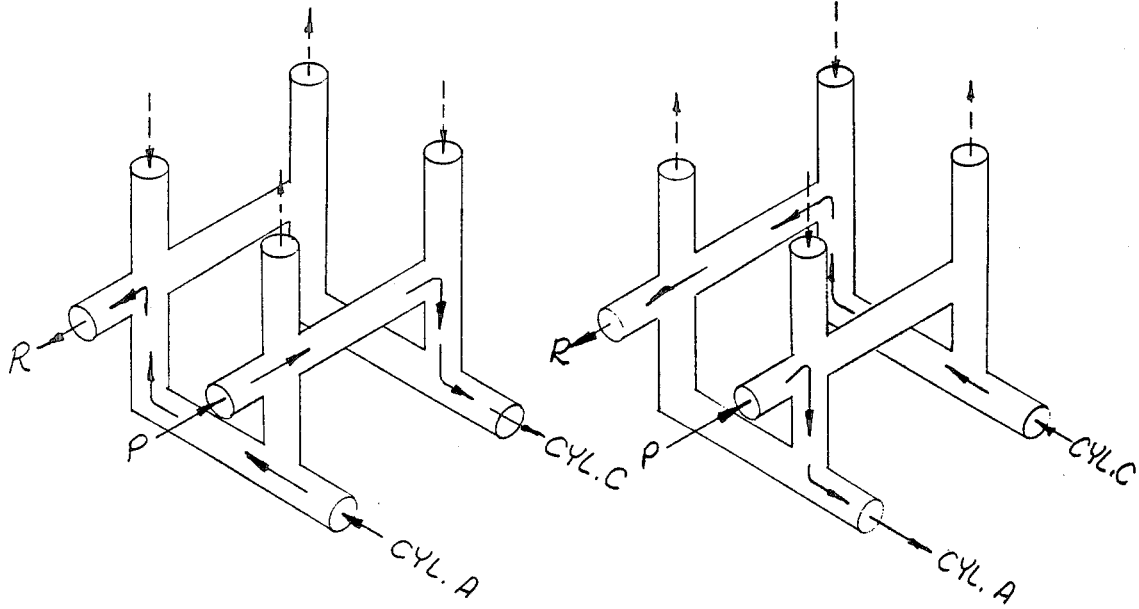
FIGS. 6 and 7 are schematic prospective views of two of the flow patterns possible through the preferred embodiment of the present invention.

FIG. 6 illustrates the situation where it is desired to charge cylinder C while simultaneously discharging cylinder A. In order to accomplish this, the actuation cams 56 are rotated in a first direction (e.g. clockwise) so that the tapered actuation surfaces 62 gradually provide a downward force on two of the four piston heads 36. These forces are illustrated in FIG. 6 by the downward broken line arrows. This downward force acts against the upward force of the biasing spring members 46 and unseats the plug member 40 from its corresponding seal member 42, thereby opening the corresponding passageway 24.

The upward force of the biasing spring members 46 maintains the other two pistons 26 of the four-way valve in the closed position as does the system fluid pressure which adds sealing force to the non-actuated pistons. The upward forces are illustrated in FIG. 6 by the upward broken line arrows. As such, pressurized fluid is allowed to flow to cylinder C while fluid is allowed to return from cylinder A as illustrated by the solid line arrows in FIG. 6. The rate at which fluid is provided to cylinder C and returned from cylinder A is controlled by the amount of rotation of the actuation cams 56. The gradual taper or slope of the actuation surface 62 permits excellent control of the amount of opening and closing of each of the pistons 26.

Alternatively, as illustrated in FIG. 7, it may be desirable to provide pressurized fluid to cylinder A while permitting fluid to return from cylinder C. Similar to that described in connection with FIG. 6 above, rotation of the actuation cams 56 in the opposite direction of that rotated in the situation illustrated in FIG. 6 (e.g. counterclockwise), provides a downward force on the various pistons as illustrated by the broken arrows in FIG. 7 so as to permit fluid to flow through the passageways and along the course illustrated by the solid line arrow. Again, regulation of fluid flow in this direction may be easily controlled due to the gradual taper or slope of the actuation surface 62 of the actuation cams 56, thereby permitting gradual opening and closing of the valve passageways 24 by sealing or unsealing the plug ends 40 of the pistons 26 from their corresponding seal members 42.

As will be appreciated by those skilled in the art, many alternative embodiments of the present invention may be accomplished incorporating the advantages of the present invention. As such, no limitations beyond those contained in the appended claims should be construed from the above description which is the purpose of the example only.

I claim:

1. A valve for controlling movement of a hydraulic component, comprising, at least one supply-return port, at least one inlet-outlet port, said inlet-outlet port communicating with the controlled hydraulic component, a plurality of passageways arranged to permit communication between said supply-return ports and said inlet-outlet ports, at least one piston positioned within said passageways between said supply-return ports and said inlet-outlet ports and arragned so as to selectively permit and vary the flow through said passageways between said ports, means arranged to gradually actuate each said piston and means to precisely measure the amount of piston actuation, wherein said means to gradually actuate said pistons includes at least one actuation cam, said actuation cam having an inclinded actuation surface, a wobble plate, said wobble plate being positioned between said actuation cam actuation surface and said pistons, and means to selectively rotate said actuation cam.

2. The valve as set forth in claim 1 wherein two inlet-outlet ports and two actuation cams are provided, each said actuation cam having a sprocket thereon, said means to selectively rotate said autuation cams includes at least one electric motor, said electric motors being connected to said actuation cam sprocket through a continuous chain, and said means to determine the amount of piston actuation includes means to monitor the rotation of said actuation cams.

3. The valve as set forth in claim 2 wherein said means to determine the amount of rotation of said actuation cams includes a potentiometer, said potentiometer being connected to a sprocket, said sprocket being engaged with said continuous chain.

4. A valve as set forth in claim 1 wherein reduced friction means are postioned between said at least one actuation cam and said piston, and said means to selectively rotate said actuation cam further includes a lower power electric motor.

5. A valve for controlling fluid flow, comprising, a supply port, a return port, a plurality of inlet-outlet ports, a plurality of passageways, said passageways providing communication between said supply port, said return port and said inlet-outlet ports, a plurality of pistons, one said piston being positioned within each said passageway between said supply and return ports and said inlet-outlet ports and arranged so as to selectively permit and vary flow through said passageways between said inlet-outlet ports and said supply and return ports, rotary means to actuate said pistons, said means including at least two actuation cams each having a tapered actuation surface, said tapered actuation surfaces acting to gradually actuate selected pistons upon rotation of said cams, thereby controlling fluid flow through the valve, and reduced friction means arranged between said actuation cam actuation surfaces and said pistons to reduce the force required to actuate said pistons.

6. The valve as set forth in claim 5 wherein said means to actuate said pistons further include means to determine the amount of piston actuation, said means including a potentiometer, said potentiometer being arranged to measure the angular position of said actuation cams.

7. A valve as set forth in claim 6 wherein said actuation means further includes a wobble plate, said wobble plate being positioned between said actuation cam surfaces and said pistons.

8. A valve for regulating fluid flow, comprising, a fluid supply port, a fluid return port, two inlet-outlet ports, a plurality of passageways arranged to communicate between said supply and return ports and each said inlet-outlet port, at least one piston means, said piston means being arranged so as to regulate fluid flow through said passageways between said supply and return ports and said inlet-outlet ports and means to selectively and gradually actuate said piston means through a tapered actuation means, said means to actuate further including reduced friction means arranged to reduce the force required to actuate said pistons and thereby control and finely meter fluid flow through the valve.

9. The valve as set forth in claim 8 wherein said inlet-outlet ports are connected to hydraulic cylinders, said cylinders being connected to a movable structure, and means to selectively actuate said piston means further includes signal means, said signal means being arranged to actuate said actuation means in response to the movement of said structure.

10. In a valve for controlling fluid flow including at least one fluid supply port, at least one fluid return port and at least one fluid inlet-outlet port, the valve also including a plurality of pistons arranged so as to control fluid flow through the various ports, the improvement comprising, means to gradually actuate the pistons, said means including at least one actuation cam having a tapered actuation surface, means to actuate said actuation cam and means to precisely measure the amount of actuation of said actuation cam.

11. A valve as set forth in claim 10 wherein reduced friction means are interposed between said tapered actuation surface and said piston means.

12. A valve as set forth in claim 11 wherein said actuation means includes at least one rotary cam means, one said rotary cam means being arranged to actuate up to two piston means, and a wobble plate, said wobble plate being positioned between each said actuation cam and said piston actuated thereby.

13. A valve for controlling fluid flow, comprising, a fluid supply means, a fluid return means, means for communicating a fluid inlet-outlet with said fluid supply and return means, at least one piston means, said piston means including means to control fluid flow through said means for communication, at least one piston actuator, said actuator including means to gradually actuate each said piston through at least one actuation cam having a tapered actuation surface acting on said piston means, and means to determine the amount of actuation of each said piston, each said piston being biased in a first direction, said means to control fluid flow through said means for communication includes a frusto-conical plug connected to said piston means and a seal member, said seal member being arranged so as to cooperatively interact with said plug when said piston is in its biased position, said piston actuator being arranged to oppose said piston bias upon actuation.

14. A valve as set forth in claim 13 wherein said means for communicating with a fluid supply and said means for communicating with a fluid return are a single passageway.

15. A valve as set forth in claim 13 wherein said actuation means includes means to rotatably actuate said actuation cam.

16. A valve as set forth in claim 15 wherein said means to determine the amount of actuation of said pistons includes a potentiometer arranged to measure the amount of rotation of said actuation cam.

17. A valve as set forth in claim 16 wherein four pistons are provided, said actuation means includes two rotatable actuation cams, each said cam being arranged so as to actuate two said pistons, and said actuation means further including means for rotatably driving said actuation cams in tandem.

18. A method of controlling fluid flow through a valve, comprising, supplying fluid through a port and passageway, returning excess fluid through a port and passageway, controlling fluid flow through said passageways with at least one biased piston, rotatably actuating each said piston with an actuation cam, said actuation cam having a tapered actuation surface so as to gradually actuate each said biased piston, and controlling the actuation of each said piston in response to an electronic signal indicating a need to modify fluid flow through one or more passageways.

19. A valve for controlling fluid flow, comprising: A valve body, said body having a fluid supply port, a fluid return port and two inlet-outlet ports therein;

a first passageway formed in said valve body, said first passageway communicating with said fluid supply port, a second passageway formed in said valve body, said second passageway communicating with said fluid return port, a third and fourth passageways formed in said valve body, said third and fourth passageways each communicating with one said inlet-outlet port, and a fifth, sixth, seventh and eight passageways formed in said valve body, said fifth, sixth, seventh and eighth passageways being substantially parallel, said fifth and sixth passageways providing communication between said first and second passageways and said third passageway, respectively, and said sixth and seventh passageways providing communication between said first and second passageways and said forth passageway, respectively;

four piston means, one of said piston means being positioned in each of said fifth, sixth, seventh and eighth passageways, said piston means being arranged so as to selectively permit and vary fluid flow through said passageways between said fluid supply port, fluid return port and the inlet-outlet ports;

rotary means to selectivley actuate said pistons, said means including two rotary actuation cams each having a tapered actuation surface, said tapered actuation surface arranged to gradually actuate selected pistons upon rotation of said cams so as to prevent fluid flow from said fluid supply port to one said inlet-outlet port while simultaneously permitting fluid to flow from the other said inlet-outlet port to said return port; and, means to precisely determine the amount and direction of rotation of said actuation cams.

20. A valve as set forth in claim 19 wherein each said inlet-outlet port is connected to a hydraulic cylinder.

21. A valve as set forth in claim 19 wherein said means to determine the amount and direction of rotation of said actuation cams includes at least one potentiometer arranged to measure the angular position of said cams.

22. A valve for controlling fluid flow, comprising:

a valve body, said body having at least one fluid supply-return port and at least one inlet-outlet port therein;

at least one supply-return passageway, one supply-return passageway being provided for each supply-return port;

at least one inlet-outlet passageway, one inlet-outlet passageway being provided for each inlet-outlet port;

at least one connecting passageway, one said connecting passageway being provided for each supply-return passageway and each inlet-outlet passageway, said connecting passageway being and arranged so as to permit communication between each said supply-return passageway and each said inlet-outlet passageway;

at least one piston means, one said piston means being positioned in each said communication passageway, each said piston means being arranged so as to selectively permit and vary flow through said communication passageways between each said fluid supply-return ports and each said inlet-outlet port;

actuation means, said actuation means arranged to selectively actuate said piston means, said means including an actuation cam having a tapered actuation surface, said tapered actuation surface arranged to gradually actuate selected pistons upon actuation of said actuation cams so as to regulate fluid flow from one or more fluid supply-return ports to one or more fluid inlet-outlet ports; and means to precisely determine which piston has been actuated what amount.

* * * * *